(12) United States Patent
Can et al.

(10) Patent No.: US 10,703,679 B2
(45) Date of Patent: Jul. 7, 2020

(54) POLYCRYSTALLINE ABRASIVE CONSTRUCTIONS

(71) Applicant: Element Six (UK) Limited, Oxfordshire (GB)

(72) Inventors: Antionette Can, Oxfordshire (GB); Anne Myriam Megne Motchelaho, Oxfordshire (GB)

(73) Assignee: ELEMENT SIX ABRASIVES S.A., Luxembourg (LU)

( * ) Notice: Subject to any disclaimer, the term of this patent is extended or adjusted under 35 U.S.C. 154(b) by 194 days.

(21) Appl. No.: 15/556,256

(22) PCT Filed: Mar. 8, 2016

(86) PCT No.: PCT/EP2016/054886
§ 371 (c)(1),
(2) Date: Sep. 6, 2017

(87) PCT Pub. No.: WO2016/142368
PCT Pub. Date: Sep. 15, 2016

(65) Prior Publication Data
US 2018/0244581 A1    Aug. 30, 2018

(30) Foreign Application Priority Data

Mar. 9, 2015    (GB) .................................. 1503976.1

(51) Int. Cl.
*B24D 3/02* (2006.01)
*C04B 35/645* (2006.01)
(Continued)

(52) U.S. Cl.
CPC .......... *C04B 35/645* (2013.01); *C04B 35/528* (2013.01); *C04B 35/5831* (2013.01);
(Continued)

(58) Field of Classification Search
USPC .......................................... 51/293, 307, 309
See application file for complete search history.

(56) References Cited

U.S. PATENT DOCUMENTS

| 2011/0297450 A1* | 12/2011 | Can ....................... C23C 28/324 |
| | | 175/426 |
| 2013/0000213 A1* | 1/2013 | Okamura .......... C04B 35/62884 |
| | | 51/307 |

FOREIGN PATENT DOCUMENTS

| EP | 2546010 | 1/2013 |
| WO | 2007110770 | 10/2007 |
| WO | 2010073198 | 7/2010 |

OTHER PUBLICATIONS

Patent Cooperation Treaty, International Search Report for PCT/EP2016/054886, 5pgs. dated Sep. 7, 2016.

* cited by examiner

*Primary Examiner* — James E Mcdonough
(74) *Attorney, Agent, or Firm* — Bryan Cave Leighton Paisner LLP

(57) ABSTRACT

A method of manufacturing a polycrystalline abrasive construction comprises providing a plurality of particles of a superhard material, the particles coated with a first matrix precursor material, providing a plurality of second matrix precursor particles having an average size less than 2 micron, the second matrix precursor particles including a liquid phase sintering agent, mixing together the plurality of particles of superhard material with particles of the second matrix precursor material and consolidating and sintering the particles of superhard material and the particles of matrix precursor material. A polycrystalline abrasive construction comprises a particles of a superhard material dispersed in a matrix material comprising a material derived from a liquid phase sintering aid and chemical barrier particles having an
(Continued)

average particle size of less than 100 nm dispersed in the matrix. Greater than 50% of the chemical barrier particles are located substantially at boundaries between superhard particles and the matrix.

7 Claims, 7 Drawing Sheets

(51) Int. Cl.
  *C04B 35/5831* (2006.01)
  *C04B 35/624* (2006.01)
  *C04B 35/528* (2006.01)
  *C04B 35/628* (2006.01)
  *B24D 3/00* (2006.01)
  *B24D 11/00* (2006.01)
  *B24D 18/00* (2006.01)
  *C09K 3/14* (2006.01)

(52) U.S. Cl.
  CPC .......... *C04B 35/624* (2013.01); *C04B 35/628* (2013.01); *C04B 35/62836* (2013.01); *C04B 2235/3217* (2013.01); *C04B 2235/3231* (2013.01); *C04B 2235/3232* (2013.01); *C04B 2235/3244* (2013.01); *C04B 2235/3813* (2013.01); *C04B 2235/3843* (2013.01); *C04B 2235/3856* (2013.01); *C04B 2235/3865* (2013.01); *C04B 2235/3886* (2013.01)

POLYCRYSTALLINE ABRASIVE CONSTRUCTIONS

FIELD

The invention relates to the field of polycrystalline abrasive constructions, and methods of making polycrystalline abrasive constructions.

BACKGROUND

Polycrystalline super hard materials, such as polycrystalline diamond (PCD) and polycrystalline cubic boron nitride (PCBN) may be used in a wide variety of tools for cutting, machining, drilling or degrading hard or abrasive materials such as rock, metal, ceramics, composites and wood-containing materials.

Abrasive compacts are used extensively in cutting, milling, grinding, drilling and other abrasive operations. They generally contain ultrahard abrasive particles dispersed in a second phase matrix. The matrix may be metallic or ceramic or a cermet. The ultrahard abrasive particles may be diamond, cubic boron nitride (cBN), silicon carbide or silicon nitride and the like. These particles may be bonded to each other during the high pressure and high temperature compact manufacturing process generally used, forming a polycrystalline mass, or may be bonded via the matrix of second phase material(s) to form a polycrystalline mass. Such bodies are generally known as polycrystalline diamond or polycrystalline cubic boron nitride, where they contain diamond or cBN as the ultrahard abrasive, respectively. Examples of diamond and cubic boron nitride abrasive compacts are described in U.S. Pat. Nos. 3,745,623; 3,767,371; 3,743,489; 4,334,928; 5,466,642 and 5,328,875.

For example, U.S. Pat. No. 4,334,928 teaches a sintered compact for use in a tool consisting essentially of 80 to 20 volume percent of high pressure form boron nitride; and the balance being a matrix of at least one binder compound material selected from the group consisting of a carbide, a nitride, a carbonitride, a boride and a suicide of a IVa or a Va transition metal of the periodic table, mixtures thereof and their solid solution compounds. The matrix forms a continuous bonding structure in a sintered body with the high pressure boron nitride interspersed within a continuous matrix. The methods outlined in this patent all involve combining the desired materials using mechanical milling/mixing techniques such as ball milling, mortars and the like.

U.S. Pat. No. 5,466,642 discloses a wear resistant cBN-based cutting tool that includes at least one of a Ti carbide/nitride component, a compound including at least one of Ti and Al, tungsten carbide, $Al_2O_3$, and the balance being cBN and incidental impurities. The method of manufacture as described involves wet blending in a ball mill. The incidental impurities mainly result from material abraded from the mill balls and body.

Known methods involving mechanical milling and mixing procedures in order to combine the desired starting materials lead to unavoidable comminution and crushing of said components. This in turn causes a wide spread of particle sizes of the often complex and manifold components to be generated with a resultant lack of homogeneity of the components. This inhomogeneity leads to an inability to accurately determine and control the phase structure of the final material after sintering and in turn the true potential of the material as a cutting tool or the like cannot be exploited. Such materials can also exhibit poor characteristics in applications, which result from an inadequate dispersion and homogeneity of the constituents.

Moreover these procedures are inappropriate as the particle sizes of the desired starting constituents become finer, in particular for submicron particulate materials and more particularly for nano-sized component materials, due to significant difficulties in dispersion. Use of these procedures thus imposes limitations on making composite materials with homogeneous submicron and nano-sized phases.

Further it is impossible to mill ultrahard abrasive particulates without to a greater or lesser extent abrading the mill balls, rods and mill body materials. Larger superhard particle grains lead to more wear of the milling media. The material so generated by this abrasion necessarily contaminates the mix of desired components with either undesirable material or, if that material could be considered as desirable, then it will be introduced in an uncontrollable and variable way. This contamination is particularly prevalent when high energy milling techniques are employed in an attempt to use submicron and nano-sized starting constituent materials. During the life of milling bodies, balls and rods the inescapable abrasion leads to progressive changes in dimensions and surface texture of these items which leads to a progressive change in their milling, mixing and comminution behaviour. These changes lead to further variability in the dispersion, homogeneity, and degree of contamination of the materials being combined and so, in turn, variability in the structure, properties and behaviour in application of the finally produced composite materials and tools. Moreover submicron and nano-grain sized materials are particularly prone to these problems and difficult to make with such methods.

There are examples in the prior art where milling and mixing techniques are not predominantly employed. For example, it is taught in U.S. Pat. No. 5,211,726 that granules of cBN or diamond, of a range of sizes from fine, about 0.1 micron, to coarse, about 1 mm, may be coated in one or more layers of active coating and these coated entities sintered at a pressure and temperature to yield multigrain abrasive compacts. The methods of coating are restricted to chemical vapour deposition (CVD) techniques, for coating multi-grained granules of a specific type of cBN material from about 50 micron to about 1 mm in size.

WO 2006/032984 describes techniques in which polycrystalline abrasive elements are produced from abrasive particles. The particles are coated using a colloidal technique, such as sol-gel, with matrix precursor materials. These coatings are heat treated in order to form a chemically protective coating on the surface of the particles.

Polycrystalline cubic boron nitride (PCBN) materials comprise cubic boron nitride (cBN) and a binder material. When used as cutting tools to machine a workpiece, the cBN is prone to chemical wear. This is a particular problem when machining hardened steels. The binder is more chemically resistant than the cBN. It is thought that components of the binder such as TiC, TiN and $TiC_xN_y$ provide much of the chemical resistance. Coating cBN with phases such as TiC or TiN is expected to improve the chemical resistance of PCBN by acting as a chemical barrier on the outside of cBN particles, but in practice it has been found that such materials do not perform well in machining applications including interrupted tests. This may be because they had not been adequately sintered, and were therefore not sufficiently tough.

SUMMARY

It is an object to provide a polycrystalline abrasive construction that has improved chemical resistance and maintains adequate hardness and toughness for machining applications.

According to a first aspect, there is provided a method of manufacturing a polycrystalline abrasive construction. A plurality of particles of a superhard material is provided, the particles coated with a first matrix precursor material. A plurality of second matrix precursor particles is provided, having an average size of less than 2 micron, the second matrix precursor particles including a liquid phase sintering agent. The particles are mixed together, and then consolidated and sintered at a pressure of between 2.5 GPa and 8 GPa and a temperature of between 600° and 1800° C.

As an option, the method comprises, prior to mixing together the plurality of particles of superhard material with the particles of the second matrix precursor material, pre-reacting the second matrix precursor particles in a vacuum at a temperature of between 500° C. and 1100° C.

The method optionally comprises coating the plurality of particles of the superhard material with the first matrix precursor material using a sol-gel process. The first matrix precursor material is optionally nitrided.

Mixing together the plurality of particles of superhard material with the particles of the second matrix precursor material is optionally achieved by any of attrition milling and sonication.

The superhard material is optionally selected from cubic boron nitride and diamond.

The first matrix material is optionally selected from any of a carbide, nitride, boride and oxide, of any of titanium, zirconium, silicon, aluminium, vanadium, niobium, tantalum, chromium, tungsten and hafnium. As a further option, the first matrix precursor material comprises titanium nitride. As a further option, the first matrix precursor material comprises any of zirconia, silica and alumina. As a further option, the first matrix precursor material comprises any of a combination of zirconia and titanium nitride, and a combination of titanium nitride and tantalum nitride.

The second matrix precursor material comprises compounds of any of titanium and aluminium. Examples of these include titanium carbonitride, titanium carbide, titanium nitride, titanium diboride, aluminium nitride and aluminium oxide.

The method optionally comprises consolidating and sintering the plurality of particles of superhard material and the particles of matrix precursor material at a pressure of between 4 GPa and 8 GPa and a temperature of between 1100° and 1600° C. Alternatively, the method comprises consolidating and sintering the plurality of particles of superhard material and the particles of matrix precursor material at a pressure of between 4 GPa and 6 GPa and a temperature of between 1100° and 1350° C.

The first coating material is optionally provided in the amount of between 5 and 50 wt % of the superhard material.

As an option, the polycrystalline abrasive construction comprises between 20 and 79 volume % of the superhard material.

According to a second aspect, there is provided a polycrystalline abrasive construction comprising a plurality of particles of a superhard material, the plurality of particles dispersed in a matrix material, wherein the matrix material comprises a material derived from a liquid phase sintering aid. In addition, the construction comprises a plurality of chemical barrier particles having an average particle size of less than 100 nm dispersed in the matrix, wherein greater than 50% of the chemical barrier particles are located substantially at boundaries between superhard particles and the matrix.

The superhard material is optionally selected from cubic boron nitride and diamond.

The chemical barrier particles optionally comprise a material selected from any of a carbide, nitride, boride and oxide, of any of titanium, zirconium, silicon, aluminium, vanadium, niobium, tantalum, chromium, tungsten and hafnium. An optional example is titanium nitride.

The matrix optionally comprises compounds of any of titanium and aluminium. Examples include any of titanium carbonitride, titanium carbide, titanium nitride, titanium diboride, aluminium nitride and aluminium oxide.

The matrix optionally comprises at least 5 volume % titanium nitride, making the polycrystalline abrasive construction electric discharge machinable.

As an option, between 5 and 100% of particles making up the matrix including the chemical barrier particles have a size by area of less than 100 nm.

Between 10 and 80% of particles making up the matrix including the chemical barrier particles optionally have a size by area of less than 100 nm.

Between 15 and 80% of particles making up the matrix including the chemical barrier particles optionally have a size by area of less than 100 nm.

Between 5 and 30% of particles making up the matrix including the chemical barrier particles optionally have a size by area of less than 50 nm.

The polycrystalline abrasive construction optionally comprises between 20 and 79 volume % of the superhard material.

According to a third aspect, there is provided a polycrystalline abrasive construction comprising a plurality of particles of a superhard material, the plurality of particles dispersed in a matrix material, and wherein the matrix material comprises a material derived from a liquid phase sintering aid, and wherein greater than 95% of particles in the matrix have a particle size by area of less than 100 nm.

The superhard material is optionally selected from cubic boron nitride and diamond.

The matrix optionally comprises particles comprising compounds of any of titanium and aluminium. Examples of these include titanium carbonitride, titanium carbide, titanium nitride, titanium diboride, aluminium nitride and aluminium oxide.

The construction optionally comprises at least 5 volume % titanium nitride, making the polycrystalline abrasive construction electric discharge machinable.

According to a fourth aspect, there is provided a machining tool comprising a polycrystalline abrasive construction as described above in the second and third aspects.

BRIEF DESCRIPTION OF DRAWINGS

Non-limiting embodiments will now be described by way of example and with reference to the accompanying drawings in which.

DETAILED DESCRIPTION

Figure 1:
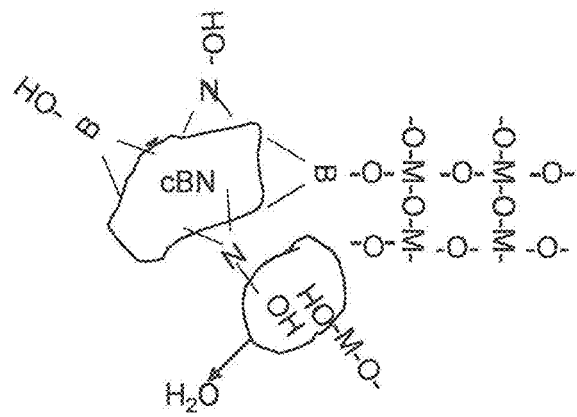
FIG. 1 illustrates schematically a sol-gel process.

Polycrystalline composite abrasive bodies are made up of micron, sub-micron, or nano-sized ultrahard abrasive particles dispersed in micron, sub-micron or nano-grain sized matrix materials.

For the purposes of this invention sub-micron particles or grains are defined as having their major diametric dimension between 1 micrometer (1000 nm) and 0.1 microns (100 nm), and nano-sized particles or grains as having their major diametric dimension smaller than 0.1 micron (100 nm).

The ultrahard abrasive particles include diamond, cubic boron nitride, silicon carbide, silicon nitride, boron carbide, boron suboxide ($B_6O$) and the like, and any combination of these particle types. Preferably the ultrahard particles are diamond or cubic boron nitride or a combination of these materials.

The matrix materials include but are not restricted to micron, sub-micron or nano-grain sized oxide, nitride, carbide, oxynitride, oxycarbide or carbonitride matrices. The sub-micron or nano-sized matrix materials include the oxides, nitrides, carbides, oxynitrides, oxycarbides and carbonitrides of aluminium, titanium, silicon, vanadium, zirconium, niobium, hafnium, tantalum, chromium, molybdenum and tungsten and any appropriate combination of these materials. Preferably these matrices will be nano-grain sized compounds of aluminium, titanium, tantalum, silicon or zirconium. The composite abrasive bodies of the invention encompass compositional ratios of dispersed ultrahard particles to matrix material of from about 25% to in excess of 98% by volume, although they are not restricted to these compositional ratios.

Precursors for the desired matrix materials may be accurately coated on each individual ultrahard particle using colloidal technology, so that each particle has substantially an identical dimensional and structural coat to all others. This enables a great degree of structural homogeneity to be obtained. This is possible for fine ultrahard particles of micron, sub-micron and even nano-sized dimensions because the precursor coating materials and subsequent final matrix materials brought about by chosen heat treatment procedures can be of a very fine nano-grain size. In turn this allows very high ultrahard particle contents above 90% by volume to be achieved, with good homogeneity.

Ultrahard abrasive particles, such as cBN, are chemically treated to render them vitreophilic, as described in WO 2006/032984. Treatments that are capable of creating chemical species on the surface required for vitreophilic behaviour of the ultrahard particles include, but are not restricted to, boiling in oxidative acids such as concentrated nitric acid, where appropriate, or exposure to strong oxidizing agents such as hydrogen peroxide solutions or heating in air or oxygen. The surfaces allow the formation and growth of oxide and hydroxide based coatings onto the particulate material and good adherence with the so formed oxide based precursor coatings.

Colloidal suspension coating of the ultrahard abrasive particles with amorphous and/or nano-grain sized, hydrated oxide precursor materials is employed. It has been found that adaptations of certain colloidal techniques are capable of accurately coating micron, sub-micron and even nano-sized ultrahard material particles. There are two general colloidal routes whereby appropriate coatings can be generated, one depending upon whether aqueous solutions of inorganic salts are used and the other where metal organic compounds are used. A preferred approach for this is the latter sol-gel approach, more preferably sol-gel approaches using the hydrolysis and polycondensation of alkoxides or alcoholates. The precursor coatings generated by this method are micro-porous, amorphous or nano-grain sized hydrated oxides of high surface area. Sol-gel techniques, in particular, are highly versatile and amenable to the control of the heterogeneous nucleation and growth of extremely accurate coats of hydrated oxide precursor materials onto the surfaces of vitreophilic suspended particles, which may be as small as 10 nm in dimensions or even smaller.

The favoured sol-gel approach is to slowly add an alcoholic solution of a metal alkoxide or combination of metal alkoxides to a suspension of ultrahard material particles in a low concentration aliquot of pure water in the same alcohol. The metal alkoxides are hydrolyzed by the water to form metal hydroxide monomers, which in turn undergo polycondensation reactions that progressively form hydrated, oxide micro porous materials, referred to in this invention as the oxide precursor materials or coats. By appropriate choice of alcohol type, typically having the same alkyl groups as the alkoxide(s), concentration of suspended ultrahard particles, concentration of alkoxide solution in the alcohol, the alkoxide water ratio, temperature and the presence or absence of other agents such as acids or bases it is possible to control the formation of a coating of the oxide precursor on the suspended ultrahard particles. Each type of alkoxide used requires specific conditions to be employed to coat the suspended ultrahard particulate material in the desired coat.

An important aspect of this approach is that the by-products of the alkoxide hydrolysis and polycondensation reactions are water, alcohols and hydroxide species on some of the free surfaces of the coating. All of these by-products are readily removable by drying and low temperature heat treatment. Moreover the alkoxides themselves are readily available as high purity grades. The alkoxide sol-gel approach thus leads to very pure uncontaminated oxides. The final matrix materials can thus be made very pure relative to those generated by the prior art methods. Certainly the ubiquitous impurities introduced by milling/mixing methods are absent in the method of this invention.

Yet another very important aspect of the method of the invention is that a large scope of mixed precursor oxide materials may be made by simultaneously employing more than one type of alkoxide based upon different metals. In this way the oxide precursor material so generated will be a mixed oxide with the different metals distributed on a molecular scale. Alternatively it is known that alkoxide complexes involving more than one metal can be made. These alkoxide complexes can be used in the method of the invention. Consequently the oxides, nitrides and carbides generated by the full use of the method of the invention can include mixed and alloyed phases. Further it is known that mixed metal alkoxide structures can be made. Use of such mixed metal alkoxides also leads to mixed metal precursor oxides and subsequently mixed metal composite matrix phases. The use of mixtures of alkoxides or mixed alkoxides also allows the doping of the precursor and subsequent matrix materials with sintering and structure modification agents such as yttria, magnesia, and the like. A great deal of the established ceramic, cermet and metallurgical material science knowledge can thus be brought to bear in the making of the composite materials via the method of the invention.

FIG. 1 illustrates schematically a CBN particle coated with a metal alkoxide, where M is a suitable metal such as titanium, tantalum, zirconia, aluminium, vanadium, niobium, silicon and so on.

After removal from suspension and washing the coated particles are slowly dried by, for example, heating in a vacuum below 100° C. The micro-porous, amorphous or nano-grain sized structure of the precursor coat materials renders them ideal for temperature programmed reaction heat treatments in gaseous reactants or environments in order to form desired fine grained and nano-grain sized ceramic and other materials as components of the composite materials.

In the third step, temperature programmed reaction heat treatments of the precursor coated ultrahard particles in chosen gaseous environments is employed to partially densify the coat and to convert it to a chosen fine or nano-grain sized ceramic material. Heat treatment in air or oxygen is employed to calcine, partially densify the coat, drive off any remaining water and alcoholic component and crystallize the coat as a desired oxide phase. Choice of heating rate, top temperature and duration of top temperature is specific to the structure, phase and type of oxide required.

If it is desired to convert the coat into a nitride the dried or air calcined coated material may be heated in dry ammonia at temperatures typically up to 1100° C., although temperatures up to and including those of about 1400° C. may be necessary in certain applications. It has been found that this temperature programmed reaction treatment progressively reduces the coat material and is capable of converting the oxide base coats to stoichiometric and non-stoichiometric nitrides and oxynitrides. Again choice of heating rate, gas flow rates, top temperature and duration of top temperature is specific to the structure, phase and type of nitride required. It has also been found that oxynitride phases can be generated by appropriate choice of the conditions.

If it is desired to convert the coat into a carbide, the dried or air calcined coated material may be heated in a mixture of carbonaceous gas such as methane or ethane and hydrogen at temperatures typically below 1200° C., although temperatures up to and including 1500° C. may be necessary in certain applications. Again choice of heating rate, gas flow rate, top temperature and duration of top temperature is specific to the structure, phase and type of carbide required. It has also been found that oxycarbide phases can be generated by appropriate choice of the conditions. Alternatively, it has been found that the nitride coats generated as described above can be converted to carbides by appropriate heat treatment in methane or ethane hydrogen mixtures. Carbonitride phases can be generated by choice of conditions.

Some of the oxide coats may readily be reduced to the corresponding elemental metal by reduction in pure hydrogen. Examples of such coats are tungstic and molybdic oxides, $WO_3$ and $MoO_3$, which may readily be reduced to the metals at low temperatures in the typical range of 500 to 700° C.

A key aspect of the temperature programmed reaction is that the grain sizes of the resulting oxide, nitride, and/or carbide coatings on the ultrahard particles are typically all nanometres in dimensions. Moreover another valuable aspect of these heat treatments was that the required temperatures and times to effect the conversions were low and short, respectively, when compared to the temperatures and times required for analogous conversions of conventional oxide materials made by melt or fusion techniques. In some cases of nitride formation temperatures as much as 400° C. lower were required for the method of the invention as compared to the nitriding of conventional oxide materials. Further the coated ultrahard particles can be separate and unagglomerated. This aids in the homogeneity of structures obtained during the subsequent high pressure, high temperature consolidation, sintering stage to follow.

In addition to creating coated ultrahard abrasive particles, a binder phase is prepared. An exemplary binder is a mixture of $TiC_{0.5}N_{0.5}$ and Al. This is mixed to ensure that the powder mixture is homogeneous. The binder is then pre-reacted, typically at temperatures of 800° C. to 1100° in vacuum (typically between $10^{-3}$ and $10^{-4}$ Torr). This ensures that powder such as Al form intermetallic and ceramic phases which are easier to break down in a subsequent size reduction step, and reduces the risk of them forming stable oxides. The binder particles are then reduced in size by any suitable technique such as attrition milling.

The coated ultrahard material and the binder phase are then mixed together and subject to a further operation such as attrition milling or sonication. This results in a mixture of fine particles of ultrahard particles and binder phase.

The mixed ultrahard particles and binder undergo a high temperature consolidation and sintering operation. This is performed at temperatures and pressures where the ultrahard particle materials are thermodynamically and chemically stable to create fully dense or near fully dense micron, sub-micron and nano-sized composite monolithic material pieces. For ultrahard materials such as diamond and cBN, these conditions are in the ranges of 2.5 GPa to 8 GPa and 600° C. to 1800° C. The dense composite materials so generated can also be bonded to metal carbide substrates in situ during the consolidation and sintering. The high pressure high temperature apparatus used can be any of those known in the art capable of generating appropriate conditions.

Figure 2:
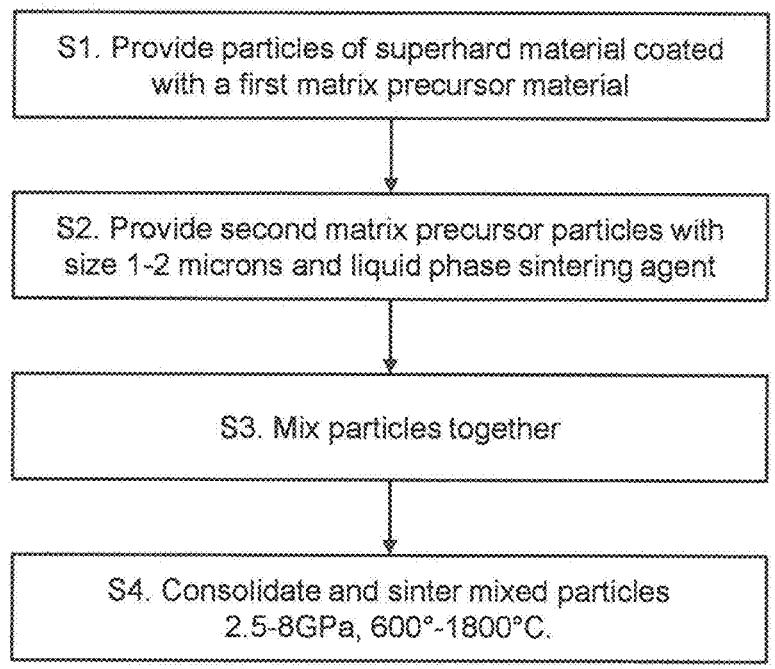
FIG. 2 is a flow diagram showing exemplary steps.

FIG. 2 shows a flow diagram of the method at a high level, with the following numbering corresponding to that of FIG. 2:

S1. A plurality of particles of a superhard material is provided. The particles are coated with a first matrix precursor material that, in the final construction, can act as a chemical barrier.

S2. A plurality of second matrix precursor particles is provided. These particles have an average size of 1-2 microns. The second matrix precursor particles include a liquid phase sintering agent.

S3. The particles from S2 and S3 are mixed together to form an intimate mixture.

S4. The mixed particles are consolidates and sintered at a pressure of between 2.5 GPa and 8 GPa and a temperature of between 600° and 1800° C. to form an abrasive construction. This construction may be formed on a substrate, such as tungsten carbide, and is suitable for use as a machining, cutting or other type of abrasive tool.

Figure 3:
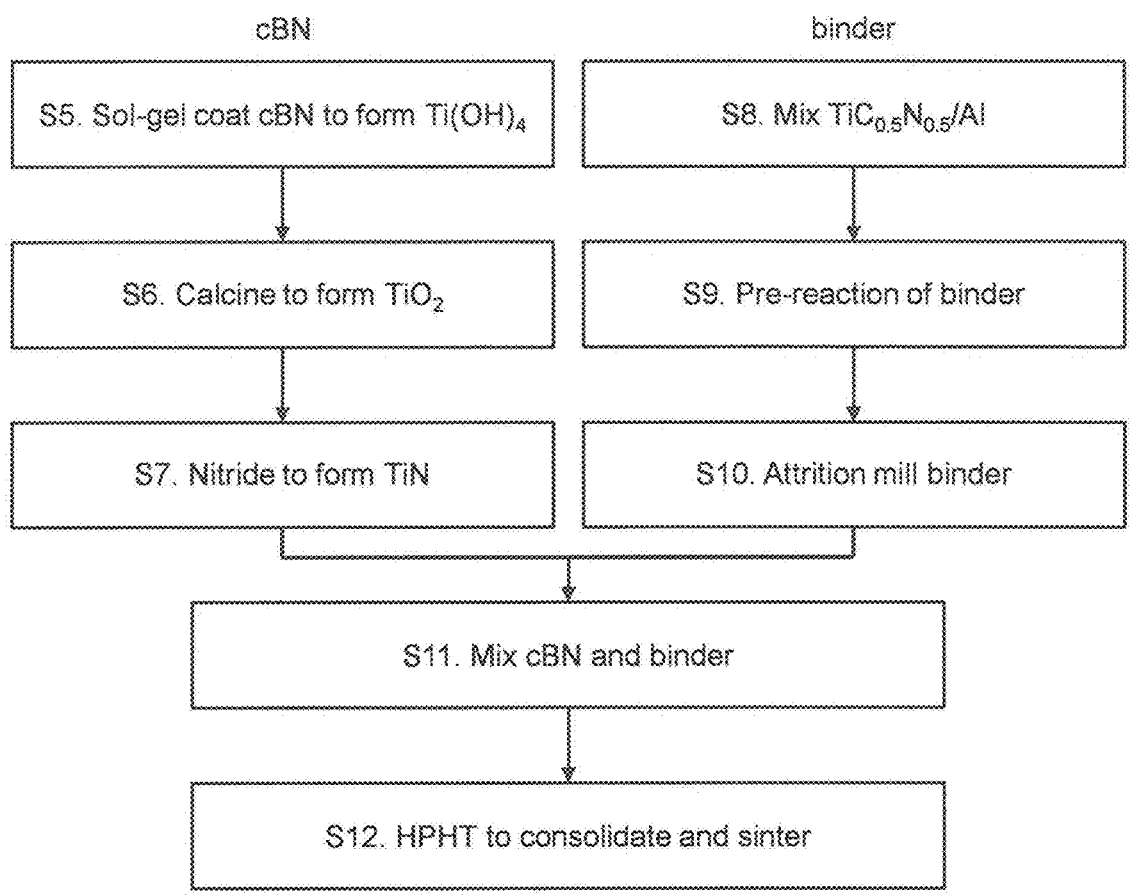
FIG. 3 is a further flow diagram showing exemplary steps.

Turning now to FIG. 3, there is shown a further flow diagram illustrated exemplary steps. In this example, the ultrahard particles are cBN and these are treated to form a TiN coating on the particles. The following numbering corresponds to that of the flow diagram:

S5. cBN particles are chemically treated top make them vitreophilic. These are then added to a solution to coating of $Ti(OH)_4$ on the particles using a sol-gel reaction. This reaction involves the hydrolysis and polycondensation reactions of metal alkoxides in alcohol solutions. Metal alkoxides or alcoholates have a general formula represented by $M^{n+}[OR]_n$, where M is a metal of valence n (in this example, M is Ti), O is oxygen and R is an alkyl group. The metal is bonded to the alkyl groups via the oxygen atoms. Most metal alkoxides are soluble in alcohols and can readily be hydrolysed with water in solution in the alcohol to form hydroxides according to equation (1):

$$M[OR]_n + nH_2O \rightarrow M[OH]_n + nROH \quad (1)$$

Polycondensation reactions as in equation (2) below can then proceed and M-O-M bonds are formed.

$$_{n-1}[HO]M\text{-}OH + HO\text{-}M[OH]_{n-1} \rightarrow {}_{n-1}[HO]M\text{-}O\text{-}M[OH]_{n-1} + H_2O \quad (2)$$

Progressive continuation of this reaction results in a three dimensional -M-O-M-O-M-network. The oxide precursor material so formed is usually amorphous or nano-grain sized with very high surface area and is micro-porous with $H_2O$ and alcohol in the pores. The surfaces of the pore structure are terminated in hydroxyl, OH functional groups. By appropriate choice of concentrations, alkoxide/water ratios, temperature, solvent alcohol and the presence of other chemical agents such as acids or bases the porous oxide precursor material can be caused to nucleate and grow as a coat on vitreophilic suspended particles in the alcohol solvent. An appropriate concentration of suspended particles to act as growing centres for the coat material should be chosen.

A solution of metal alkoxide(s) is made up in anhydrous alcohol and then slowly added over a time period of about a few hours, to a continuously stirred suspension of the ultrahard particles in an aliquot of pure water in usually the same alcohol. A peptizing agent such as an acid or base may be added to stabilize the suspension.

Alternatively where a particularly reactive alkoxide reagent is to be employed, better control over the coating formation can be created by slowly adding an aliquot of water in alcohol to a suspension of the ultrahard particles in a suspension of the alkoxide in anhydrous alcohol.

The water and alcohol by-products of the reactions may be removed by drying and low temperature heat treatment. Similarly the OH surface functional groups can be removed. Typically after filtering or centrifuging the suspensions followed by washing in new clean alcohol and then de-ionized water, the coated particles can slowly be dried at about 60° C. under a low vacuum for about two days. Further removal of residual water and alcohol can then by achieved by heating to about 300° C. in air. Many elements of the periodic table are capable of forming alkoxides. The alkoxides found to be useful for creating oxide matrices using the method of this invention include those of titanium, aluminium, zirconium, chromium, silicon with the alkoxides of calcium, magnesium, hafnium, yttrium sometimes used as additives including combinations of these alkoxides. The alkoxides found to be useful for creating nitride matrices using the method of this invention include those of aluminium, titanium, zirconium, silicon, tantalum, chromium, niobium, hafnium, vanadium, molybdenum and tungsten, and combinations of these. The alkoxides found to be useful for creating carbide matrices using the method of this invention include those of titanium, zirconium, silicon, tantalum, chromium, niobium, hafnium, vanadium, molybdenum and tungsten and combinations of these. In this example, a titanium alkoxide is used.

The alkyl groups R in the generalized formula for metal alkoxides, $M[OR]_n$, may include methyl, ethyl, n-propyl, n-butyl and any of the general formula $-C_xH_{2x+1}$. In addition the alkyl groups where side chain alkyl groups are present, such as in the iso-propyl group, $-CH(CH_3)_2$, or sec-butyl group, $-CHCH_2CH_3CH_3$, are included.

The rate of the hydrolysis reaction and the time to the gelling point for each metal alkoxide are greatly dependent upon the chain length of the alkyl groups. A smaller chain length R leads to faster hydrolysis and a shorter gelling time of the oxide precursor material in the coating of the ultrahard particles. The coating characteristics for each type of desired hydrated oxide precursor coat may be strongly influenced by the choice of R.

The alcohols used as the solvent for the alkoxide and water, and as the suspension fluid for the ultrahard particles, may be chosen from any of the normally commercially available liquid solvents. The preferred alcohols are ethanol, methanol and iso-propyl alcohol. Table 1 provides an exemplary, but not a complete, list of suitable alkoxides.

TABLE 1

| Metal (M) | Alkoxide name |
|---|---|
| Titanium | Titanium methoxide |
|  | Titanium tetraethoxide |
|  | Titanium n-propoxide |
|  | Titanium iso-propoxide |
|  | Titanium n-butoxide |
| Aluminium | Aluminium methoxide |
|  | Aluminium tri-ethylate |
|  | Aluminium n-propoxide |
|  | Aluminium iso-propoxide |
|  | Aluminium n-butoxide |
|  | Aluminium tri-sec-butylate |
| Silicon | Silicon methoxide |
|  | Silicon orthosilicate |
| Zirconium | Zirconium methoxide |
|  | Zirconium ethoxide |
|  | Zirconium n-propoxide |
| Vanadium | Vanadium ethoxide |
|  | Vanadyl oxy-ethoxide |
|  | Vanadyl oxy-iso-propoxide |
| Niobium | Niobium ethoxide |
| Tantalum | Tantalum ethoxide |
| Chromium | Chromium ethoxide |
| Tungsten | Tungsten ethoxide |
| Hafnium | Hafnium ethoxide |

S6. The coated particles now undergo temperature programmed heat treatment. This is done in chosen gaseous environments, at chosen heating rates, to chosen top temperatures, for chosen times in order to control removal of residual volatile impurities, to densify and sinter, to change to other structural phases and to chemically react the coating with the gases leading to other material types and phases. A preferred approach is to use a flowing gas system with a carefully chosen and controlled flow rate. The heating of the coated particulate material may be done in a tube furnace, rotating tube furnace, organized to slowly "stir" the particles and so prevent fritting or agglomeration, or any appropriate furnace arrangement for the controlled heating of particulate materials in chosen controlled gaseous environments.

In this example, the coated particles cBN particles are calcined in air or oxygen to convert the coat into a chosen still semi-dense oxide ($TiO_2$). Depending upon the particular porous oxide precursor material being dealt with, partial sintering and or crystallization will occur involving a partial densification. Phase changes to different crystal structured oxide may also occur and can be organized to form desired oxides. Usually nano-grain sized oxide(s) are formed by this method. In each case, the required heat treatment conditions are determined by using reaction monitoring and characterization techniques such as Thermogravimetric Analysis (TGA), Differential Thermal Analysis (DTA), X-ray Diffraction (XRD) and the like. The heating can be carried out in any convenient equipment capable of accommodating fine particulate material, although rotating furnaces and fluidized bed furnaces are preferred.

Note that an alternative is to heat the dried coated particles in ammonia or ammonia inert gas mixtures to convert the porous oxide precursor coat to a nitride(s) or oxynitride(s). The ammonia decomposes into active nitrogen and hydrogen species which progressively reduce and nitride the precursor oxide coat. By choice of conditions, various oxynitride and nitride structures can be formed. Again the required heat treatment conditions are determined by using reaction monitoring and characterization techniques such as TGA, DTA, XRD and the like.

A further alternative is to heat the dried coated cBN particles in carbonaceous hydrogen gas mixtures to convert the porous oxide precursor coat to a carbide(s) or oxycarbide(s). The carbonaceous gases may in principle be any hydrocarbon gas such as methane or ethane. The carbonaceous/hydrogen gas mixtures may be diluted in inert carrier gases such as argon, for example. Typical methane or ethane/hydrogen ratios are from 1/5 to 1/20. The required heat treatment conditions are determined by using reaction monitoring and characterization techniques such as TGA, DTA, XRD and the like.

S7. In this example, the coating is oxidised to form $TiO_2$. A further step is required to form TiN, by applying ammonia environment heat treatments to obtain the nitrides. This may occur for 5 hours at around 1100° C. in an ammonia environment.

The heating temperatures necessary to produce crystalline species of the designed compositions and structures for the coat materials are relatively low. This can result in the formation of low-temperature crystalline species not obtained by more conventional solid state reactions normally conducted at higher temperatures. Most of the temperatures required are below 1200° C., are often below 1000° C. and even as low as 550° C. in some cases.

The ultrahard particles individually coated in the designed oxide, nitride or carbide phases and microstructures can now be consolidated into fully dense or near fully dense nano-grain sized composite material pieces by hot pressing treatments, preferably high pressure/high temperature treatment.

S8. The binder precursor powder for the ultrahard material compact is prepared. In this example, the coated particles are cBN particles. The binder precursor powders are mixed together to form a homogenous powder. Any suitable mixing technique may be used. In this example, the binder material precursor materials are primarily $TiC_{0.5}N_{0.5}$ and Al. Al is added as a liquid phase sintering aid in order to improve the toughness of the sintered material. It was noted that cBN coated with nano-TiN and sintered without a sintering aid did not perform well in machining tests, as it was thought that the sintered material was not sufficiently tough.

S9. Once a homogeneous mixture of the binder precursor powder has been prepared it is pre-reacted at temperatures of between 800° C. and 1100° C. (typically around 1025° C.) in a vacuum. Pre-reaction under these conditions ensures that additives such as aluminium, which are included as a liquid phase sintering aid, form intermetallic and ceramic phases that are easier to break down and less likely to form stable materials such as oxides. This ensures that in a subsequent size reduction step (step S6) they are more likely to break down into smaller particles.

S10. The binder precursor powder particles are reduced in size by any suitable technique such as attrition milling.

S11. The TiN-coated cBN particles are mixed with the binder precursor powders, and the resultant mixture is mixed (for example by attrition milling or sonication) to ensure a homogeneous mixture of the cBN particles and the precursor powders.

S12. The resultant powder mixture is hot pressed at high pressures to form an ultrahard compact. Hot pressing gives distinct advantages in comparison to pressureless sintering in achieving full densities and minimal grain growth for the consolidation of nano-grain sized materials. Examples of hot pressing techniques that can be employed are uniaxial hot pressing in carbon dies in so designed furnaces, hot isostatic pressing (HIP), extrusion and high pressure techniques. cBN is prone to conversion to hexagonal phases when subjected to prolonged high temperatures such as 1600° C. or more at ambient pressures. In the light of this, high pressure/high temperature hot pressing prevents this transformation to the hexagonal phase. Typical conditions that can be employed, but not restricted to, are pressures from about 2.5 to about 8 GPa and temperatures for each pressure, governed by the thermodynamic and/or chemical stability of cBN, typically in the range about 600° C. to about 1800° C. The types of high temperature/high pressure equipment that may be employed include piston and cylinder devices, piston and anvil devices, cubic anvil presses, and toroidal and belt apparatuses and others well known in the art.

The ultrahard particles individually clad in the designed, usually semi-dense, oxide, nitride, or carbide coats may be subjected to granulation, spray drying, freeze drying, fluidized bed granulation, all with or without temporary organic binding materials. Conventional cold pressing may also be employed to produce porous, semi-dense, "green" articles of any convenient shape using the free powder or granulated material. Pressure/temperature/time profiles are chosen in each case to densify and sinter the coating material, minimize or control grain growth and produce the composite material pieces.

The very homogeneous fine and nano-grain sized abrasive composite materials so generated exhibited improvements in properties as a result of their homogeneity and ultra-fine microstructures as compared to similar composite materials made via more conventional approaches such as milling and mixing of separate powder starting materials. Furthermore, the steps of pre-reaction (S9) and milling (S10) (to combine appropriate liquid phase sintering agent) of the binder precursor powders improve the strength of the bonding between the cBN particles and the binder matrix. Smaller particles have a higher surface area to volume ratio, leading to more bonding.

Improvements in toughness and chemical wear resistance were observed but most remarkably significant improvements in high temperature strength and hardness were found. Composite materials with novel combinations of materials, compositions and microstructures may also be made using the method of this invention. The abrasive fine grained composite materials so obtained in both monolithic or bonded to a hard metal substrate form, can be used in applications such as cutting, milling, grinding, drilling hard to machine materials including rock drilling and other abrasive operations.

Different materials have been prepared and tested, as described in the following non-limiting examples.

Example 1

Part 1: 5 wt % TiN Coated cBN Grade 2

A powder mixture was produced that contains 5 wt % titanium nitride coated on cubic boron nitride (1.2 μm average grain size) via the sol-gel route.

a)—Dispersion of the cBN Powder

Cubic boron nitride powder (95 g) was suspended in 1.2 L of AR ethanol and ultrasonically probed using a BDC2000 Branson sonicator for 15 minutes at 35-45% amplitude to eliminate agglomerates. At the end of the cycle, the solution was left to cool to room temperature and placed under a shear mixer.

b)—Sol-Gel Coating of cBN with Titania

Titanium precursor, titanium (IV) iso-propoxide (22.94 g), was weighed into a clean and dry separating funnel and diluted fourfold with dry ethanol. The funnel was closed and shaken to dissolve the precursor in the ethanol. The funnel was then clamped at an angle of about 60° on to a retort stand. De-ionised water (14.56 g, a quantity such that the number of moles of water is ten times the number of moles of titanium (IV) iso-propoxide) was dissolved in a quantity of AR ethanol such that the total volume is the same as that of the diluted precursor and transferred to another separating funnel. This funnel was also clamped on a retort stand. The two solutions hence prepared were simultaneously fed into the sheared mixed grit suspension at a rate of 2 drops/second for approximately 2 hours. After the addition of the reagents, the suspension was left to continue mixing under the same conditions for 1.5 hours. The mixture was transferred onto a stirrer plate, covered and stirred overnight at 400 rpm. The mixture was then dried in a rotavapour and then in an oven at 80° C. for 24 h.

c)—Heat Treatment of the Coated Powder

The coated powder was sieved using a 212 μm sieve and transferred in an alumina boat for calcination in static air using a muffle furnace. The sample was calcined at 450° C., 5° C./min for 5 hr. After calcination, the sample was nitrided (heat treatment in a controlled atmosphere) using 100% ammonia gas (4l/min), in a tube furnace at 1100° C. for 5 h. The heating rate was set at 10° C./min. The 5 wt % TiN coated cBN was then obtained.

Part 2: Premix Preparation a)—Pre-reaction $Ti(C_{0.5}N_{0.5})_{0.8}$ (135 g) and aluminium (15 g) powders were placed in a 250 ml plastic container together with 8×8 mm WC balls and premixed for 1 hr using a turbula mixer (weight ratio of $Ti(C_{0.5}N_{0.5})_{0.8}$ to aluminium 90:10). The mixed powder after removing the WC balls was placed in a titanium cup and compacted; then pre-reacted in a vacuum furnace at 1025° C. for 30 min. The pre-reacted slug was then crushed using a mortar and pestle and the resulting material was sieved with using a 212 μm sieve.

Part 3: Attrition Milling and Mixing of TiN Coated cBN with Binder

Pre-reacted powder (21.18 g), WC balls (3 mm diameter, 160 ml), n-hexane (31 ml) and Lubrizol (0.64 ml) were place in a 250 ml polyamide pot and attrition milled using a Dispermat Attrition mill at a speed of 1500 rpm for a period of 4 hr. Hexane additions were made at various time intervals during the milling process in order to keep the slurry viscosity as consistent as possible. After 4 hours of milling, TiN coated cBN (26.15 g), n-hexane (36 ml) and Lubrizol (0.78 ml) were added to the milling pot and milled for an additional 30 min. The slurry was separated from the balls and dried using a rotavapor, and then the composite powder was stored overnight in a vacuum oven. This composite powder had 60 vol % cBN.

Part 4: Precomposite Preparation and High Pressure High Temperature Sintering

The mixed and dried powder (60 vol % cBN together with nano-coating of TiN and milled cermet material) was pressed into metal encapsulation. Approximately 5.0 g of powder was weighed into each cup of approximately 18 mm diameter and then pressed under 8 ton loads in the semi-automated hydraulic/pneumatic press. The metal encapsulated powder (called a 'precomposite') was then heat treated in a vacuum furnace at 750° C. for 20 minutes to remove any adsorbed species from the powder. The sealed precomposites were then sintered at approximately 6.8 GPa and 1350° C. for 20 minutes.

Part 5: Processing of the Sintered Compacts and Application Test

The sintered solid composites were processed (face and outer diameter (OD) grinding followed by lapping) in order to expose the disc and cut 10×10 mm. Small pieces of each variant were fine polished for SEM analysis.

The cutting tools (cut 10×10 mm) with a thickness of 3.2 mm were edge prepared to tool specification of SNMN090308502020) and tested in machining of case hardened steel in a face turning continuous operation (H05) and drilled moderate interrupt operation (H15) (workpiece-SAE 8620). The test conditions were as follows: Speed: 150 m/min; feed: 0.15 mm; Depth of cut: 0.2 mm.

Figure 4:
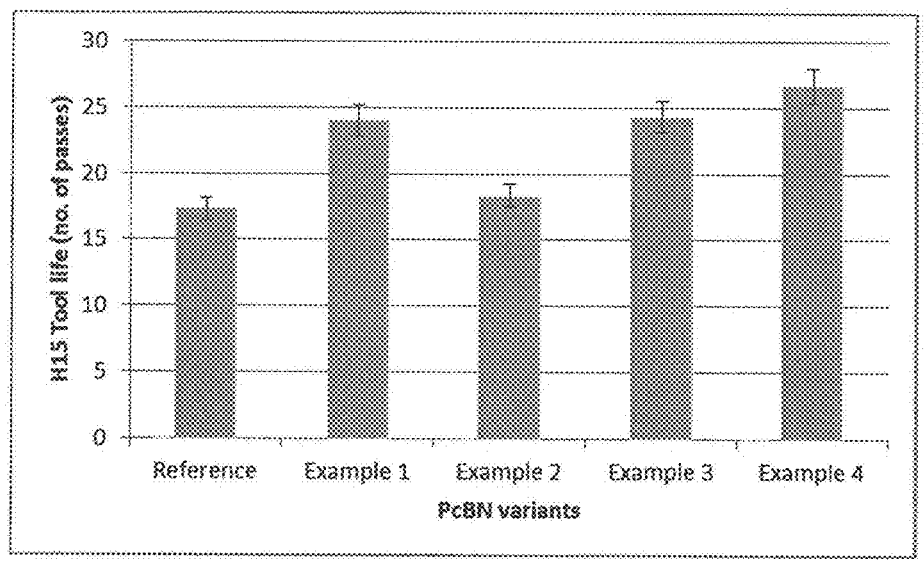
FIG. 4 is a graph showing machining tests giving tool life of a tool made using a reference material and material from examples 1 to 4.
Figure 5:
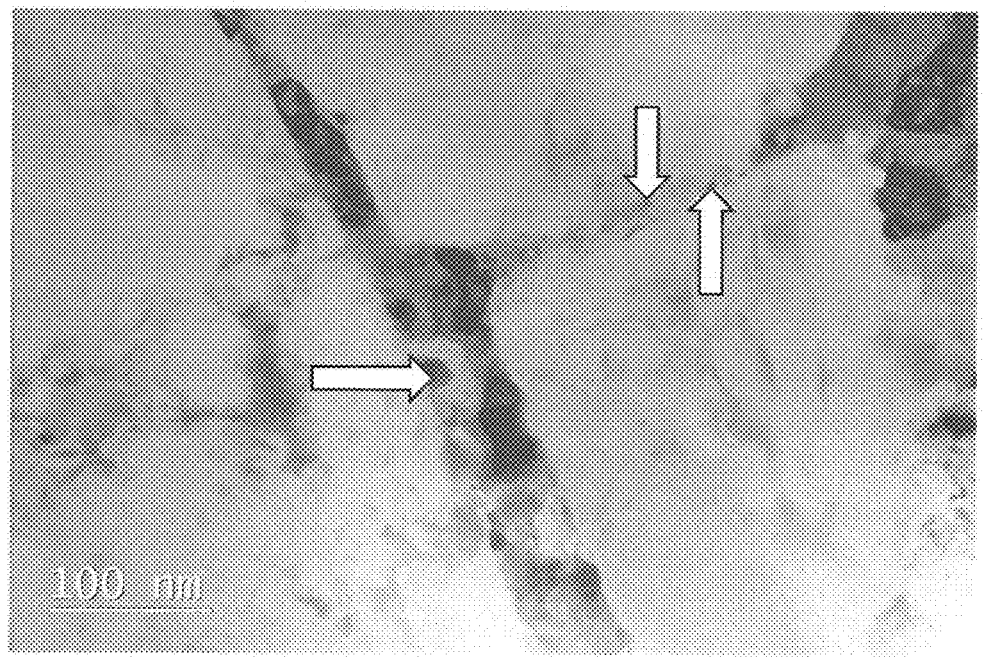
FIG. 5 is a transmission electron micrograph of sintered 5 wt % nano-TiN coated cBN material (example 1)

The performance of this material was 33% better than an industry benchmark in H15 application (shown in FIG. 4).

Transmission electron microscope analysis of the sintered material (as shown in 5) showed the presence of fine (less than 50 nm) titanium nitride particles around the cBN grains. This micrograph shows large pale cBN grains with smaller particles (illustrated by arrows) in the boundaries between the cBN grains.

Example 2

A powder mixture comprising 5 wt % titanium nitride coated on cubic boron nitride (1.2 μm average grain size) was produced via the sol-gel route. Experimental protocol as described in Example 1 was followed. The composite powder (60 vol % cBN together with nano-TiN coating and milled cermet material) was sintered at 6.8 GPa and approximately 1450° C. for 20 minutes. Processed materials were analysed using XRD and SEM analysis which confirmed the nano-structure and homogeneity of the material.

Cutting tools were also prepared and tested in H15 application, as described in example 1. The performance of this material was 38% better than an industry benchmark in H15 (shown in FIG. 4).

Example 3

Part 1: 15 wt % TiN Coated cBN Grade 2

A power mixture was produced that contains 15 wt % titanium nitride coated on cubic boron nitride (1.2 μm average grain size) via the sol-gel route.

a)—Dispersion of the cBN Powder

Cubic boron nitride powder (85 g) was suspended in 1.2 L of AR ethanol and ultrasonically probed using a BDC2000 Branson sonicator for 15 min at 35-45% amplitude to eliminate agglomerates. At the end of the cycle, the solution was left to cool to room temperature and placed under a shear mixer.

b)—Sol-Gel Coating of cBN with Titania

Titanium precursor, titanium (IV) iso-propoxide (68.90 g), was weighed into a clean and dry separating funnel and diluted fourfold with dry ethanol. The funnel was closed and shaken to dissolve the precursor in the ethanol. The funnel was then clamped at an angle of about 60° on to a retort stand. De-ionised water (43.67 g) was dissolved in a quantity of AR ethanol such that the total volume would be the same as that of the diluted precursor and transferred to another separating funnel. This funnel was also clamped on a retort stand. The two solutions hence prepared were simultaneously fed into the sheared mixed grit suspension at a rate of 2 drops/second for approximately 2 hours. After the addition of the reagents, the suspension was left to continue mixing under the same conditions for 1.5 hours. The mixture was transferred onto a stirrer plate, covered and stirred overnight at 400 rpm. The mixture was then dried in a rotavapour and then in an oven at 80° C. for 24 h.

c)—Heat Treatment of the Coated Powder

The coated powder was sieved using a 212 µm sieve and transferred in an alumina boat for calcination in static air using a muffle furnace. The sample was calcined at 450° C., 5° C./min for 5 hr. After calcination, the sample was nitrided (heat treatment in a controlled atmosphere) using 100% ammonia gas (4l/min), in a tube furnace at 1100° C. for 5 h. The heating rate was set at 10° C./min. The 15 wt % TiN coated cBN was then obtained.

Part 2: Premix Preparation a)—Pre-Reaction $Ti(C_{0.5}N_{0.5})_{0.8}$ (135 g) and aluminium (15 g) powders were placed in a 250 ml plastic container together with 8×8 mm WC balls and premixed for 1 hr using a turbula mixer. The mixed powder after removing the WC balls was placed in a titanium cup and compacted; then pre-reacted in a vacuum furnace at 1025° C. for 30 min. The pre-reacted slug was then crushed using a mortar and pestle and the resulting material was sieved with using a 212 µm sieve.

Part 3: Attrition Milling and Mixing of TiN Coated cBN with Binder

Pre-reacted powder (18.56 g), WC balls (3 mm diameter, 160 ml), n-hexane (27 ml) and Lubrizol (0.56 ml) were place in a 250 ml polyamide pot and attrition milled using a Dispermat Attrition mill at a speed of 1500 rpm for a period of 4 hr. Hexane additions were made at various time intervals during the milling process in order to keep the slurry viscosity as consistent as possible. After 4 hr of milling, TiN coated cBN (29.22 g), n-hexane (39 ml) and Lubrizol (0.88 ml) were added to the milling pot and milled for an additional 30 min. The slurry was separated from the balls and dried using a rotavapor, and then the composite powder was stored overnight in a vacuum oven. This composite powder had 60 vol % cBN.

Part 4: Precomposite Preparation and High Pressure High Temperature Sintering

The mixed and dried powders were pressed into metal encapsulation. Approximately 5.0 g of powder was weighed into each cup of approximately 18 mm diameter and then pressed under 8 ton loads in the semi-automated hydraulic/pneumatic press. The metal encapsulated precomposite was then heat treated in a vacuum furnace at 750° C. for 20 minutes to remove any adsorbed species from the powder. The sealed precomposites were then sintered at approximately 6.8 GPa and 1350° C. for 20 minutes.

Part 5: Processing of the Sintered Compacts and Application Test

The sintered solid composites were processed (face and OD grinding follow by lapping) in order to expose the disc and cut 10×10 mm. Small pieces of each variant were fine polished for SEM analysis.

The cutting tools (cut 10×10 mm) with a thickness of 3.2 mm were edge prepared and tested in machining of case hardened steel in a face turning continuous operation (H05) and drilled moderate interrupt operation (H15)(workpiece-SAE 8620). The test conditions were as follow: Speed: 200 m/min; feed: 0.1 mm; Depth of cut: 0.15 mm.

Cutting tools were also prepared and tested in H15 application, as described in example 1. The performance of this material was 25% better than an industry benchmark in H15 (shown in FIG. 4).

Example 4

A powder mixture comprising 15 wt % titanium nitride coated on cubic boron nitride (1.2 µm average grain size) was produced via the sol-gel route. Experimental protocol as described in Example 3 was followed. The composite powder (60 vol % TiN coated cBN+$Ti(C_{0.5}N_{0.5})_{0.8}$ Al binder) was sintered at 6.8 GPa and approximately 1450° C. for 20 minutes.

Processed materials were analysed using XRD and SEM analysis which confirmed the presence of cBN, TiN, $TiC_{0.7}N_{0.3}$ and $TiB_2$.

Figure 6:
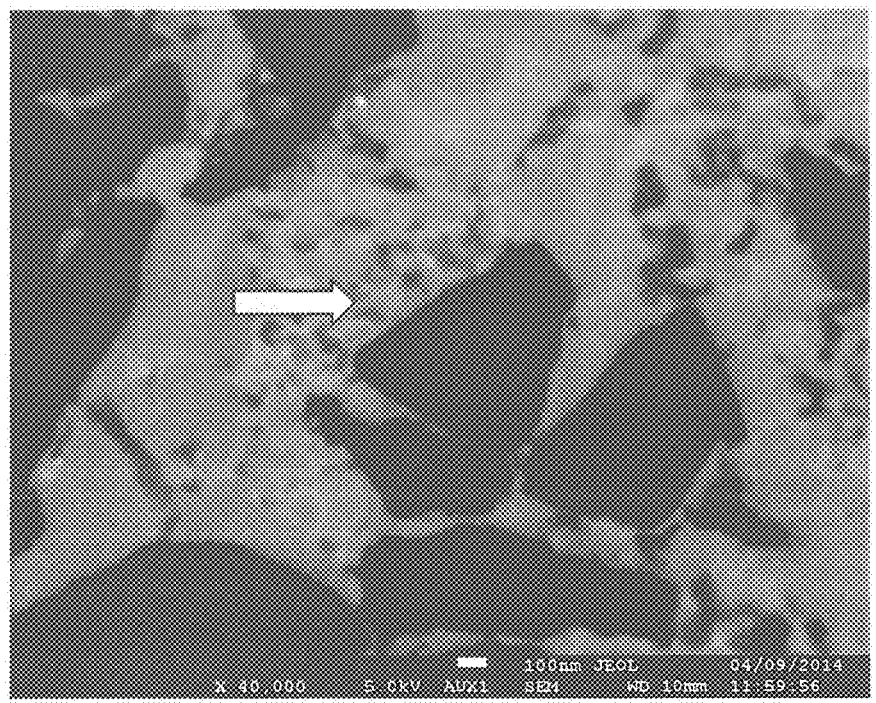
FIG. 6 is a scanning electron micrograph of the material of example 4.
Figure 7:
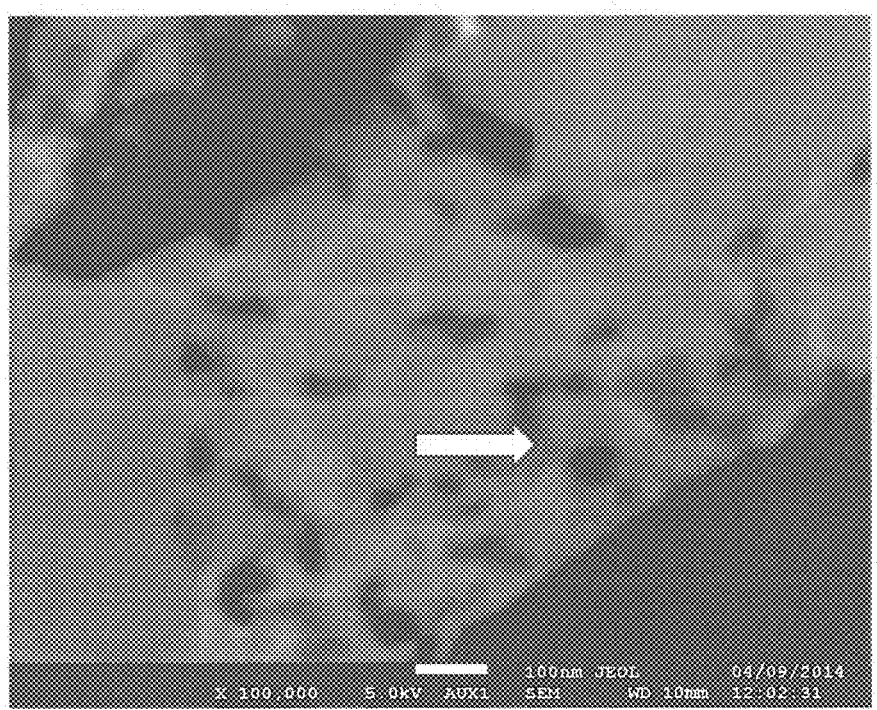
FIG. 7 is a further scanning electron micrograph of the material of example 4.

FIGS. 6 and 7 how the fine structure of nano ceramic particles in the matrix of the sintered material of Example 4. A considerable fraction of 'super-nano-TiN' particles (less than 50 nm) can be seen in these images. In FIG. 6 the cBN particles are the large dark particles in the pale matrix. The arrow shows a region of super-nano-TiN particles located close to the boundary between a cBN particle and the matrix. The very fine TiN particles can be seen in the matrix of FIG. 7.

Cutting tools were also prepared and tested in H15 application, as described in example 1. The performance of this material was 54% better than an industry benchmark in H15 (shown in FIG. 4).

Example 5

A powder mixture comprising 15 wt % titanium nitride coated on cubic boron nitride (1.2 µm average grain size) was produced via the sol-gel route as described in example 3. Experimental protocol as described in example 3 was followed in order to produce a composite powder of 60 vol % TiN coated cBN+$Ti(C_{0.5}N_{0.5})_{0.8}$/Al Binder. The powder system was sintered at 5.5 GPa and approximately 1450° C. for 20 minutes. Processed materials were analysed using XRD and SEM analysis which confirmed the presence of cBN, TiN, $TiC_{0.7}N_{0.3}$ and $TiB_2$.

Example 6

A powder mixture comprising 15 wt % titanium nitride coated on cubic boron nitride (1.2 µm average grain size) was produced via the sol-gel route as described in example 3. In order to produce a composite containing 45 vol % TiN coated cBN+$Ti(C_{0.5}N_{0.5})_{0.8}$/Al binder, pre-reacted powder (27.85 g), WC balls (3 mm diameter, 160 ml), n-hexane (41 ml) and Lubrizol (0.84 ml) were place in a 250 ml polyamide pot and attrition milled using a Dispermat Attrition mill at a speed of 1500 rpm for a period of 4 hr. Hexane additions were made at various time intervals during the milling process in order to keep the slurry viscosity as consistent as possible. After 4 hr of milling, TiN coated cBN (21.92 g), n-hexane (26 ml) and Lubrizol (0.66 ml) were added to the milling pot and milled for an additional 30 min. The slurry was separated from the balls and dried using a rotavapor, conditioned and then stored in a vacuum oven overnight. The powder system was sintered at 6.8 GPa and approximately 1450° C. for 20 minutes. Processed materials were analysed using XRD and SEM analysis which confirmed the presence of cBN, TiN, $TiC_{0.7}N_{0.3}$ and $TiB_2$.

Example 7

Figure 8:
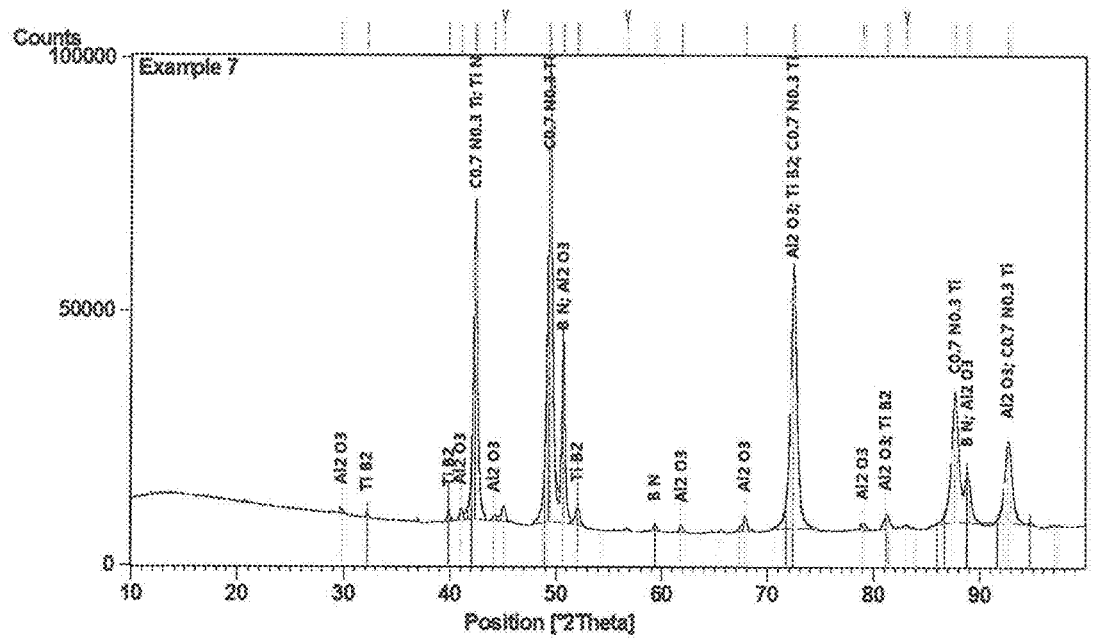
FIG. 8 is an X-ray diffraction trace of the material of example 7.

A powder mixture comprising 15 wt % titanium nitride coated on cubic boron nitride (1.2 μm average grain size) was produced via the sol-gel route as described in example 3. Experimental protocol as described in example 6 was followed in order to produce a composite powder of 45 vol % TiN coated cBN+Ti $(C_{0.5}N_{0.5})_{0.8}$/Al Binder. The powder system was sintered at 5.5 GPa and approximately 1450° C. for 20 minutes. Processed materials were analysed using XRD and SEM analysis which confirmed the presence of cBN, TiN, $TiC_{0.7}N_{0.3}$ and $TiB_2$ (as is shown in FIG. 8).

This material was processed to produce a tool which was tested against SAE8620 steel in a continuous face-cutting operation. Cutting conditions were: 200 m/min cutting speed, feed rate: 0.1 mm/revolution and depth of cut: 0.15 mm and the test was abbreviated—run for 5 passes (sliding distance of about 700 mm).

Figure 9:
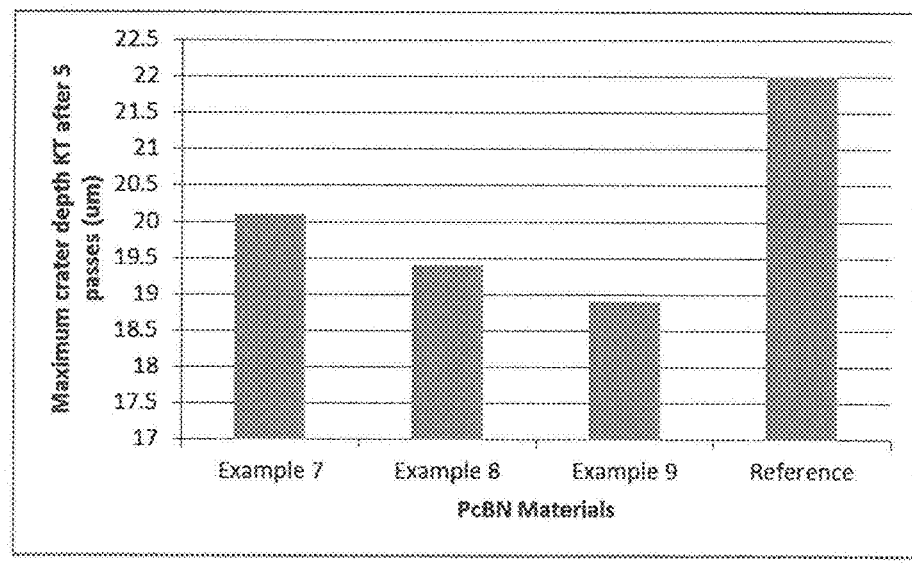
FIG. 9 is a graph showing crater depth obtained in machining tests of a tool made using a reference material and examples 7 to 9.
Figure 10:
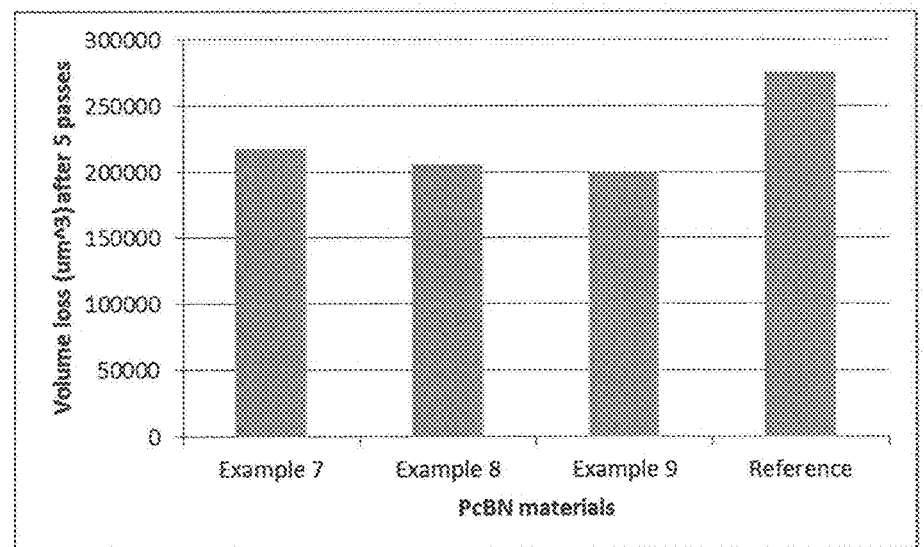
FIG. 10 is a graph showing volume loss of tool material in machining tests of a tool made sing a reference material and examples 7 to 9.

Flank and crater wear was measured to compare with the 45 vol % cBN reference material. Crater wear, which is related to chemical wear in PCBN materials, given as maximum crater wear depth, $K_T$, was determined to be 20 microns for this material, compared with the reference material which was 22 microns (shown in FIG. 9). Volume loss (in the crater) was also determined using Alicona 3D imaging technology and was measured to be 21% lower than the reference material (shown in FIG. 10).

Example 8

A powder mixture comprising 15 wt % titanium nitride coated on cubic boron nitride (1.2 μm average grain size) was produced via the sol-gel route as described in example 3. The premix consisting of titanium carbonitride (Ti $(C_{0.5}N_{0.5})_{0.8}$) and aluminium was prepared as described in example 3. The pre-reacted powder was then attrition milled.

Pre-reacted powder (117.07 g), WC balls (3 mm diameter, 460 ml), n-hexane (171.29 ml) and Lubrizol (3.51 ml) were place in a 750 ml polyamide pot and attrition milled using a Dispermat Attrition mill at a speed of 1000 rpm for a period of 4 hr. Hexane additions were made at various time intervals during the milling process in order to keep the slurry viscosity as consistent as possible. After milling, the slurry was then separated from the balls and dried using a rotavapor to form the binder.

The mixing of the 15 wt % TiN coated cBN with the binder was achieved by sonication. Binder powder (69.63 g), Lubrizol (2 ml) and n-hexane (200 ml) were place in an 800 ml beaker and sonicated using a BDC2000 Branson sonicator for 10 min at 40% amplitude; 15 wt % TiN coated cBN (54.79 g) was then added to the mixture and sonicated for an extra 5 min. The suspension was cooled in an ice bath during the sonication process. After sonication, the mixture was dried using a rotavapor, conditioned (controlled oxidation of the powder) and stored in a nitrogen cabinet.

The mixed powder was sintered at 5.5 GPa and approximately 1450° C. for 20 minutes.

Processed materials were analysed using XRD and SEM analysis which confirmed the presence of cBN, TiN, $TiC_{0.7}N_{0.3}$ and $TiB_2$.

An abbreviated screening applications test as described in Example 7 was carried out using this material. The $K_T$ for this material was measured to be 19.4 microns, compared with reference material measurement of 22 microns (shown in FIG. 9). Volume loss (in the crater) was also determined using Alicona 3D imaging technology and was measured to be 25% lower than the reference material (shown in FIG. 10).

Example 9

Figure 11:
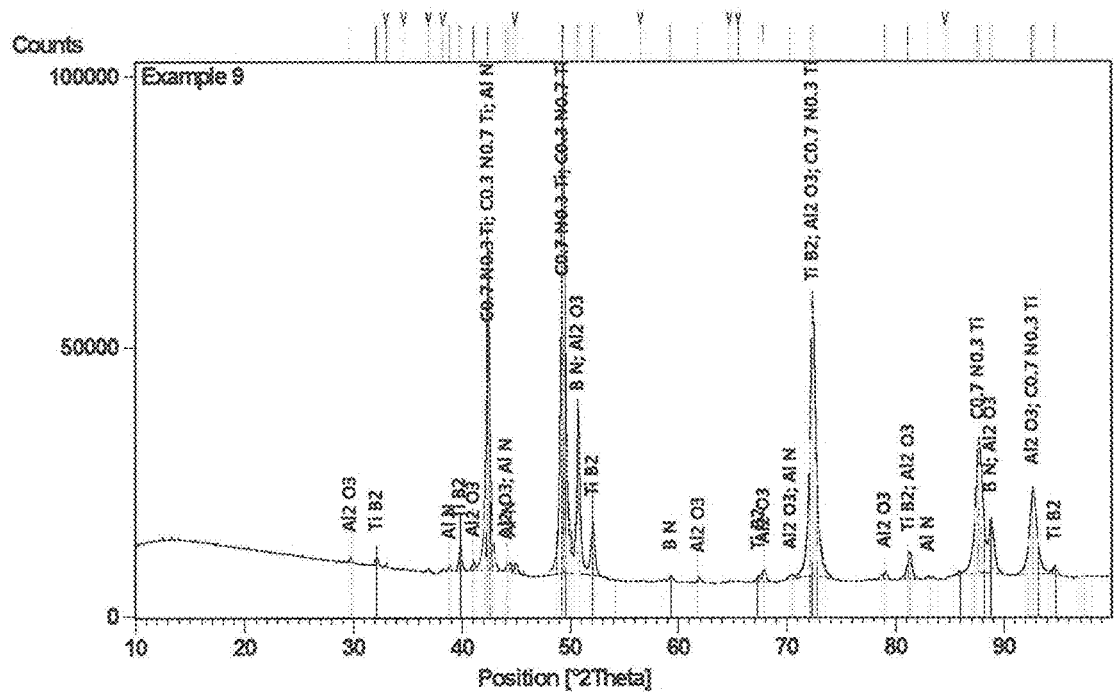
FIG. 11 is an X-ray diffraction trace of the material of example 9.

A powder mixture comprising 15 wt % titanium nitride coated on cubic boron nitride (1.2 μm average grain size) was produced via the sol-gel route as described in example 3. Experimental protocol as described in example 8 was followed in order to produce a composite powder of 45 vol % TiN coated cBN+Ti $(C_{0.5}N_{0.5})_{0.8}$/Al Binder. The mixed powder was sintered at 5.5 GPa and approximately 1450° C. for 20 minutes. Processed materials were analysed using XRD and SEM analysis which confirmed the presence of cBN, TiN, $TiC_{0.7}N_{0.3}$, AlN (trace), $TiB_2$ and trace amount of $Al_2O_3$ (as shown in FIG. 11).

An abbreviated screening applications test as described in Example 7 was carried out using this material. The $K_T$ for this material was measured to be 18.9 microns, compared with reference material measurement of 22 microns (shown in 9). Volume loss (in the crater) was also determined using Alicona 3D imaging technology and was measured to be 28% lower than the reference material (shown in FIG. 10).

Figure 12:
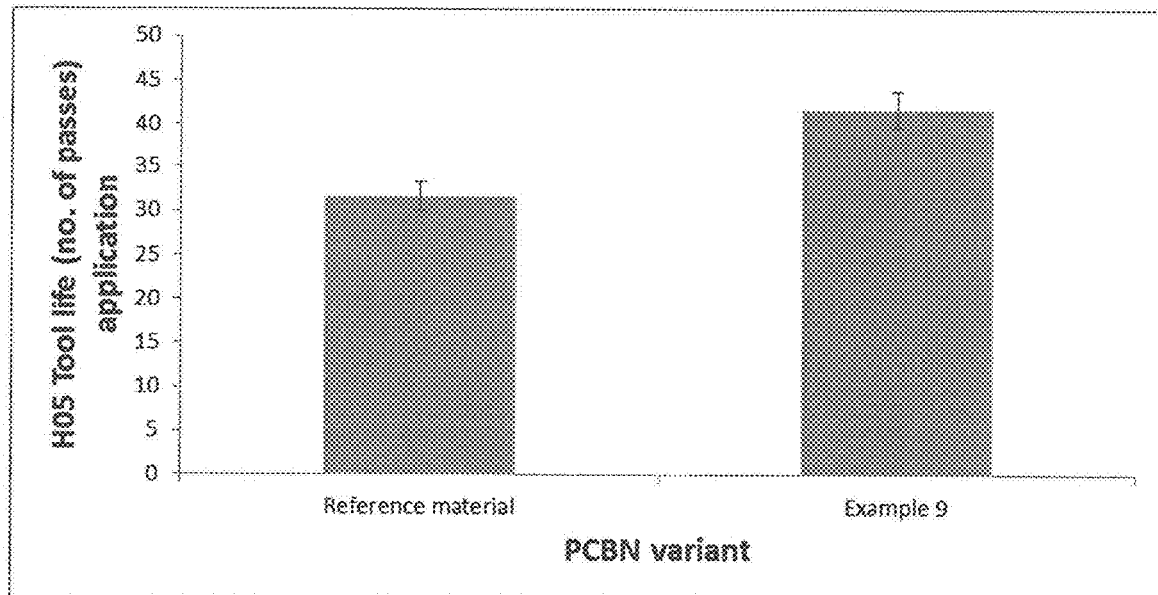
FIG. 12 is a graph showing end of tool life tests for example 9.

The same cutting conditions were then employed to run the tool in H05 continuous cutting operation until failure ('tool life'). The tool life of this material was measured to be 30% higher than the reference material in this application (with similar cBN content), giving a strong indication of chemical protection of the cBN as a result of the presence of the nano-TiN coatings (shown in FIG. 12).

Example 10

Part 1: 30 wt % TiN Coated on 1.2 Micron cBN

A power mixture was produced that contains 15 wt % titanium nitride coated on cubic boron nitride (1.2 μm average grain size) via the sol-gel route.

a)—Dispersion of the cBN Powder 85 grams of cubic boron nitride powder was suspended in 1.2 L of AR ethanol and ultrasonically probed using a BDC2000 Branson sonicator for 15 min at 35-45% amplitude to eliminate agglomerates. At the end of the cycle, the solution was left to cool to room temperature and placed under a shear mixer.

b)—Sol-Gel Coating of cBN with Titania

Titanium precursor, titanium (IV) iso-propoxide (137.80 g), was accurately weighed into a clean and dry separating funnel and diluted 4 fold with dry ethanol. The funnel was closed and shaken to dissolve the precursor in the ethanol. The funnel was then clamped at an angle of about 60° on to a retort stand. De-ionised water (87.34 g) was dissolved in a quantity of AR ethanol such that the total volume would be the same as that of the diluted precursor and transferred to another separating funnel. This funnel was also clamped on a retort stand. The two solutions hence prepared were simultaneously fed into the sheared mixed grit suspension at a rate of 2 drops/second for approximately 2 hours. After the addition of the reagents, the suspension was left to continue mixing under the same conditions for 1.5 hours. The mixture was transferred onto a stirrer plate, covered and stirred overnight at 400 rpm. The mixture was then dried in a rotavapor and then in an oven at 80° C. for 24 hr.

c)—Heat Treatment of the Coated Powder

The coated powder was sieved using a 212 µm sieve and transferred in an alumina boat for calcination in static air using a muffle furnace. The sample was calcined at 450° C., 5° C./min for 5 hr. After calcination, the sample was nitrided (heat treatment in a controlled atmosphere) using 100% ammonia gas (4l/min), in a tube furnace at 1100° C. for 5 hr. The heating rate was set at 10° C./min. The 15 wt % TiN coated cBN was then obtained.

Part 2: Premix Preparation a)—Pre-Reaction

Ti($C_{0.5}N_{0.5}$)$_{0.8}$ (135 g) and aluminium (15 g) powders were placed in a 250 ml plastic container together with 8×8 mm WC balls and premixed for 1 hr using a turbula mixer. The mixed powder after removing the WC balls was placed in a titanium cup and compacted; then pre-reacted in a vacuum furnace at 1025° C. The pre-reacted slug was then crushed using a mortar and pestle and the resulting material was sieved with using a 212 µm sieve.

Part 3: Attrition Milling and Mixing of TiN Coated cBN with Binder

Pre-reacted powder (13.21 g), WC balls (3 mm diameter, 160 ml), n-hexane (20 ml) and Lubrizol (0.40 ml) were place in a 250 ml polyamide pot and attrition milled using a Dispermat Attrition mill at a speed of 1500 rpm for a period of 4 hr. Hexane additions were made at various time intervals during the milling process in order to keep the slurry viscosity as consistent as possible. After 4 hr of milling, TiN coated cBN (35.49 g), n-hexane (48 ml) and Lubrizol (1.1 ml) were added to the milling pot and milled for an additional 30 min. The slurry was separated from the balls and dried using a rotavapor, conditioned and stored in a vacuum oven overnight. This composite powder had 60 vol % cBN.

Part 4: Precomposite Preparation and High Pressure High Temperature Sintering

The composite powder was pressed into metal encapsulation. Approximately 5.0 g of powder was weighed into each cup of approximately 18 mm diameter and then pressed under 8 ton loads in the semi-automated hydraulic/pneumatic press. The precomposite was then heat treated in a vacuum furnace at 750° C. for 20 minutes to remove any adsorbed species from the powder. The sealed precomposites were then sintered at approximately 5.5 GPa and 1350° C. for 20 minutes.

Part 5: Processing of the Sintered Compacts

The sintered solid composites were processed (face and OD grinding follow by lapping) in order to expose the disc and cut 10×10 mm. Small pieces of each variant were fine polished for SEM analysis.

Processed materials were analysed using XRD and SEM analysis which confirmed the presence of cBN, TiN, $TiC_{0.7}N_{0.3}$ and $TiB_2$.

Example 11

A powder mixture comprising 30 wt % titanium nitride coated on cubic boron nitride (1.2 µm average grain size) was produced via the sol-gel route as described in example 10. Experimental protocol as described in example 10 was followed and a 60 vol % cBN and Ti ($C_{0.5}N_{0.5}$)$_{0.8}$/Al matrix material was produced. The powder system was sintered at 6.8 GPa and approximately 1450° C. for 20 minutes. Processed materials were analysed using XRD and SEM analysis which confirmed the nano-structure and homogeneity of the material.

Example 12

A powder mixture comprising 30 wt % titanium nitride coated on cubic boron nitride (1.2 µm average grain size) was produced via the sol-gel route as described in example 10. In order to produce a composite containing 45 vol % TiN coated cBN+Ti($C_{0.5}N_{0.5}$)$_{0.8}$/Al binder, pre-reacted powder (23.84 g), WC balls (3 mm diameter, 160 ml), n-hexane (35 ml) and Lubrizol (0.74 ml) were place in a 250 ml polyamide pot and attrition milled using a Dispermat Attrition mill at a speed of 1500 rpm for a period of 4 hr. Hexane additions were made at various time intervals during the milling process in order to keep the slurry viscosity as consistent as possible. After 4 hr of milling, TiN coated cBN (26.61 g), n-hexane (32 ml) and Lubrizol (0.80 ml) were added to the milling pot and milled for an additional 30 min. The slurry was separated from the balls and dried using a rotavapor, conditioned and then stored in a vacuum oven overnight. The powder system was sintered at 5.5 GPa and approximately 1350° C. for 20 minutes. Processed materials were analysed using XRD and SEM analysis which confirmed the nano-structure and homogeneity of the material.

Example 13

A powder mixture comprising 30 wt % titanium nitride coated on cubic boron nitride (1.2 µm average grain size) was produced via the sol-gel route as described in example 10. Experimental protocol as described in example 12 was followed in order to produce a composite powder of nano-TiN coated 45 vol % cBN and Ti ($C_{0.5}N_{0.5}$)$_{0.8}$/Al milled material. The powder system was sintered at 6.8 GPa and approximately 1450° C. for 20 minutes. Processed materials were analysed using XRD and SEM analysis which confirmed the nano-structure and homogeneity of the material.

Example 14

A powder mixture comprising 30 wt % titanium nitride coated on cubic boron nitride (1.2 µm average grain size) was produced via the sol-gel route as described in example 10. In order to produce a composite containing 30 vol % TiN coated cBN+Ti($C_{0.5}N_{0.5}$)$_{0.8}$/Al binder, pre-reacted powder (34.48 g), WC balls (3 mm diameter, 160 ml), n-hexane (51 ml) and Lubrizol (1.0 ml) were place in a 250 ml polyamide pot and attrition milled using a Dispermat Attrition mill at a speed of 1500 rpm for a period of 4 hr. Hexane additions were made at various time intervals during the milling process in order to keep the slurry viscosity as consistent as possible. After 4 hr of milling, TiN coated cBN (17.74 g), n-hexane (16 ml) and Lubrizol (0.53 ml) were added to the milling pot and milled for an additional 30 min. The slurry was separated from the balls and dried using a rotavapor, conditioned and then stored in a vacuum oven overnight. The powder system was sintered at 5.5 GPa and approximately 1350° C. for 30 minutes. Processed materials were analysed using XRD and SEM analysis which confirmed the nano-structure and homogeneity of the material.

Example 15

A powder mixture comprising 30 wt % titanium nitride coated on cubic boron nitride (1.2 μm average grain size) was produced via the sol-gel route as described in example 10. Experimental protocol as described in example 14 was followed in order to produce a composite powder of nano-TiN coated 30 vol % cBN and Ti$(C_{0.5}N_{0.8})_{0.8}$/Al milled material. The powder system was sintered at 5.5 GPa and approximately 1400° C. for 30 minutes. Processed materials were analysed using XRD and SEM analysis which confirmed the nano-structure and homogeneity of the material.

Example 16

A powder mixture comprising 15 wt % titanium nitride coated on cubic boron nitride (1.2 μm average grain size) was produced via the sol-gel route as described in example 3. Experimental protocol as described in example 8 was followed. The amount of milled ceramic powder was adjusted to 77.38 g and that of the TiN coated cBN to 48.71 g to produce a composite powder of 40 vol % cBN together with a matrix of nano-TiN and Ti $(C_{0.5}N_{0.5})_{0.8}$/Al. The powder system was sintered at 5.5 GPa and approximately 1350° C. for 20 minutes. Processed materials were analysed using XRD and SEM analysis.

Example 17

A powder mixture comprising 15 wt % titanium nitride coated on cubic boron nitride (1.2 μm average grain size) was produced via the sol-gel route as described in example 3.

Experimental protocol as described in example 8 was followed. The amount of binder was adjusted to 54.14 g and that of the TiN coated cBN to 66.97 g to produce a composite powder of nano-TiN coated 40 vol % cBN together with milled Ti $(C_{0.5}N_{0.5})_{0.8}$/Al matrix material. The powder system was sintered at 5.5 GPa and approximately 1350° C. for 20 minutes. Processed materials were analysed using XRD and SEM analysis.

Reference Materials

In order to compare the exemplary materials with a reference, reference materials containing cBN particles that were not coated by TiN were prepared.

The reference material (reference 1) in the case of the H15 machining application was a 55 vol % cBN material of average particle size 1.5 micron and matrix material of submicron and nano TiC$_{0.5}$N$_{0.5}$/AlN (produced by attrition milling powder processing routes).

The reference material (reference 2) in the case of H05 application was a 45 vol % cBN material of average particle size 1.5 micron and matrix material of submicron and nano-TiC$_{0.5}$N$_{0.5}$/AlN (produced by attrition milling powder processing routes).

For ease of reference, a summary of the exemplary materials described above is given in Table 2. Column 2 shows the weight percent of TiN coating as a fraction of the cBN particles when applied as a coating. Column 6 shows the total volume percent of nano-TiN derived from the coating in the final composition. There may be additional nano-TiN particles present in the matrix formed from the binder precursor materials.

TABLE 2

| Ex | Composition of superhard particles | cBN vol % | Mixing method | Sintering Conditions | nano-TiN vol % from coating |
|---|---|---|---|---|---|
| 1 | 5 wt % TiN-cBN | 60 | cBN attrition milled 30 min | 6.8 GPa 1350° C. | 2 |
| 2 | 5 wt % TiN-cBN | 60 | cBN attrition milled 30 min | 6.8 GPa 1450° C. | 2 |
| 3 | 15 wt % TiN-cBN | 60 | cBN attrition milled 30 min | 6.8 GPa 1350° C. | 6.7 |
| 4 | 15 wt % TiN-cBN | 60 | cBN attrition milled 30 min | 6.8 GPa 1450° C. | 6.7 |
| 5 | 15 wt % TiN-cBN | 60 | cBN attrition milled 30 min | 5.5 GPa 1450° C. | 6.7 |
| 6 | 15 wt % TiN-cBN | 45 | cBN attrition milled 30 min | 6.8 GPa 1450° C. | 5.1 |
| 7 | 15 wt % TiN-cBN | 45 | cBN attrition milled 30 min | 5.5 GPa 1450° C. | 5.1 |
| 8 | 15 wt % TiN-cBN | 45 | Sonication | 5.5 GPa 1450° C. | 5.1 |
| 9 | 15 wt % TiN-cBN | 45 | Sonication | 5.5 GPa 1450° C. | 5.1 |
| 10 | 30 wt % TiN-cBN | 60 | cBN attrition milled 30 min | 5.5 GPa 1350° C. | 16.3 |
| 11 | 30 wt % TiN-cBN | 60 | cBN attrition milled 30 min | 6.8 GPa 1450° C. | 16.3 |
| 12 | 30 wt % TiN-cBN | 45 | cBN attrition milled 30 min | 5.5 GPa 1350° C. | 12.2 |
| 13 | 30 wt % TiN-cBN | 45 | cBN attrition milled 30 min | 6.8 GPa 1450° C. | 12.2 |
| 14 | 30 wt % TiN-cBN | 30 | cBN attrition milled 30 min | 5.5 GPa 1350° C. | 8.2 |
| 15 | 30 wt % TiN-cBN | 30 | cBN attrition milled 30 min | 5.5 GPa 1400° C. | 8.2 |
| 16 | 15 wt % TiN-cBN | 40 | Sonication | 5.5 GPa 1350° C. | 4.5 |
| 17 | 15 wt % TiN-cBN | 55 | Sonication | 5.5 GPa 1350° C. | 6.2 |
| Ref 1 | cBN | 55 | cBN attrition milled 30 min | 5.5 GPa 1400° C. | 0 |
| Ref 2 | cBN | 45 | cBN attrition milled 30 min | 5.5 GPa 1400° C. | 0 |

Particle Size

In order to characterise the resultant sintered materials, particle size analysis was performed. Lines were drawn across three images of each material along the main length of the material and a linear intercept method was employed to estimate particle size of all particles in the matrix between the cBN grains. This resulted in the measurement of between 600 and 1000 particles per example.

Linear particle sizes were then plotted in terms of a frequency distribution and number fraction of particles less than 50 nm, less than 75 nm and less than 100 nm. The results are provided in Table 3.

TABLE 3

| | Ex. 4 | Ex. 6 | Ex. 7 | Ex. 10 | Ex. 11 | Ex. 13 | Ref 1 |
|---|---|---|---|---|---|---|---|
| <50 nm | 0.18 | 0.2 | 0.24 | 0.34 | 0.27 | 0.30 | 0.27 |
| <75 nm | 0.32 | | | 0.48 | 0.41 | 0.47 | |
| <100 nm | 0.51 | 0.55 | 0.47 | 0.69 | 0.62 | 0.68 | 0.55 |

Figure 13:
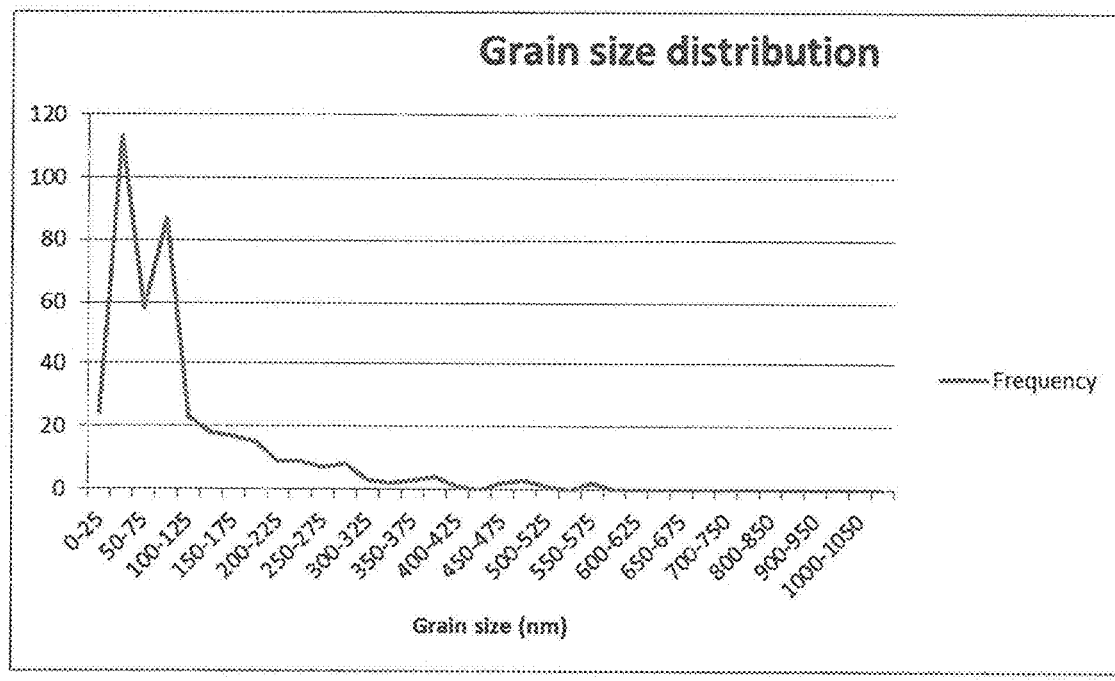
FIG. 13 is a graph of frequency distribution of grain sizes for the material of example 13.

Grain size distributions were plotted for the examples. By way of example, FIG. 13 shows a frequency distribution of grain sizes for the material of example 13.

Particle sizes were then translated to approximate particle diameters and making the assumption of cBN particles to be spheres, areas of individual particles was calculated.

The total area of matrix material was calculated by summation of all individual particle areas and so-called 'area' fractions of different particle sizes were calculated. For example, the total area of particles less than 100 nm in diameter was calculation by summation of areas and calculated as a fraction of total matrix area. The area fractions of particles in the matrix are provided in Table 4.

TABLE 4

|  | Ex. 4 | Ex. 7 | Ex. 8 | Ex. 10 | Ex. 11 | Ex. 13 | Ref 1 |
| --- | --- | --- | --- | --- | --- | --- | --- |
| <50 nm | 0.18 | 0.28 | 0.26 | 0.34 | 0.27 | 0.31 | 0.38 |
| <75 nm | 0.32 | 0.40 | 0.38 | 0.48 | 0.41 | 0.47 | 0.54 |
| <100 nm | 0.51 | 0.57 | 0.50 | 0.69 | 0.62 | 0.68 | 0.68 |

Electric Discharge Machining

From a production and tool manufacturing perspective, cost and quality of tool edges is improved when using electric discharge machining (EDM) compared with laser machining. This is because laser machining can cause damage on the edges on the cutting tool. EDM is therefore favoured. Percolation theory in its original form (Broadbent, S. R., Hammersley, J. M., Proc. Camb. Philos. Soc., vol. 53, 1957, p. 629, Kirkpatrick, S., Modern Phys., vol. 45, 1973, p. 574) showed that flow of a fluid would not happen unless a certain non-zero number of active bonds or 'fluid-carrying channels' was exceeded. This number is known as the 'percolation threshold' (Kirkpatrick, S., Rev. Modern Phys., vol. 45, 1973, p. 574). This is a standard model for disordered systems and in 1971 Shante and Kirkpatrick (Shante, V. K. S., Kirkpatrick, S., Adv. Phys., vol. 20, 1971, p. 325) suggested that this theory could be used to explain conductor-semiconductor transitions in some disordered solid state systems.

According to this model, a continuous path of a low electrical resistivity phase (such as TiN (Weimer, A. W., Carbide, Nitride and Boride Material Synthesis and Processing, Chapman and Hall, London 1997) interconnecting between high resistivity particles (such as cBN), could provide a conduction pathway provided the percolation threshold was exceeded. For solid state systems this could be between 5 and 30 vol % of the overall material.

Kawano et al. give the example of $Si_3N_4$ coated with nano-titanium nitride and sintered by Spark Plasma Sintering (Kawano et al., Journal of European Ceramic Society, vol. 24, 2004, pp 309-312) where the electrical resistivity of the composite material was reduced from $10^{\wedge}8$ ohm cm at 0 vol % TiN to $10^{\wedge}-3$ ohm cm above 17.5 vol % addition of nano-TiN. At levels of $10^{\wedge}-3$ ohm cm resistivity EDM cuttability of a material is considered to be viable.

When the sintered materials described above are used to make a tool, the presence of non-phase TiN particles in the matrix between particles of cBN, in addition to providing a chemical barrier to the cBN particles during a machining operation, also allow the sintered material to be machined into a desired tool form using EDM. A presence of at least around 5 to 15 vol % TiN in the matrix should be adequate to allow EDM, provided that the TiN particles form a contiguous conduction path through the material.

Definitions

As used herein, a "super hard material" is a material having a Vickers hardness of at least about 28 GPa. Diamond and cubic boron nitride (cBN) material are examples of super hard materials.

As used herein, PCBN (polycrystalline cubic boron nitride) material refers to a type of super hard material comprising grains of cubic boron nitride (cBN) dispersed within a matrix comprising metal or ceramic. PCBN is an example of a super hard material.

As used herein, a "PCBN structure" comprises a body of PCBN material.

A "binder material" is understood to mean a material that wholly or partially fills pores, interstices or interstitial regions within a polycrystalline structure.

A multi-modal size distribution of a mass of grains is understood to mean that the grains have a size distribution with more than one peak, each peak corresponding to a respective "mode". Multimodal polycrystalline bodies may be made by providing more than one source of a plurality of grains, each source comprising grains having a substantially different average size, and blending together the grains or particles from the sources. In one embodiment, a PCBN structure may comprise CBN grains having a multimodal distribution.

As used herein, a "super-nano" particle is one with a size of 50 nm lower.

While this invention has been particularly shown and described with reference to embodiments, it will be understood by those skilled in the art that various changes in form and detail may be made without departing from the scope of the invention as defined by the appending claims. For example, although all of the examples use cBN as the superhard phase, it will be appreciated that the same techniques may be used for other types of superhard materials, such as diamond.

Furthermore, the examples above refer to providing a TiN coating to act as a chemical barrier to the superhard particles and protect them from chemical wear. Other types of coating may be used. For example, a coating of substantially tetragonal zirconia could be added. This has the further benefit of providing a transformation toughening mechanism if the tetragonal zirconia changes to a monoclinic phase.

The invention claimed is:

1. A method of manufacturing a polycrystalline abrasive construction, the method comprising:
   providing a plurality of particles of cubic boron nitride, the particles coated with a first matrix precursor material using a sol-gel process;
   providing a plurality of second matrix precursor particles having an average size less than 2 micron, the second matrix precursor particles including a liquid phase sintering agent;
   pre-reacting the second matrix percursor particles in a vacuum at a temperature of between 750° C. and 1025° C.;
   mixing together the plurality of particles of cubic boron nitride with the particles of the second matrix precursor material;
   consolidating and sintering the plurality of particles of cubic boron nitride and the particles of matrix precursor material at a pressure of between 2.5 GPa and 8 GPa and a temperature of between 600° and 1800° C.

2. The method according to claim 1, further comprising nitriding the first matrix precursor material.

3. The method according to claim 1, wherein the first matrix material is selected from any of a carbide, nitride, boride and oxide, of any of titanium, zirconium, silicon, aluminium, vanadium, niobium, tantalum, chromium, tungsten and hafnium.

4. The method according to claim 1, wherein the second matrix precursor material comprises any of titanium carbonitride, titanium carbide, titanium nitride, titanium diboride, aluminium nitride and aluminium oxide.

5. The method according to claim 1, further comprising consolidating and sintering the plurality of particles of cubic boron nitride and the particles of matrix precursor material at a pressure of between 4 GPa and 8 GPa and a temperature of between 1100° and 1600° C.

6. The method according to claim 1, wherein the first coating material is provided in the amount of between 5 and 50wt % of the cubic boron nitride.

7. The method according to claim 1, wherein the polycrystalline abrasive construction comprises between 20 and 79 volume % of the cubic boron nitride.

* * * * *